US009318011B2

(12) United States Patent
Rasband

(10) Patent No.: US 9,318,011 B2
(45) **Date of Patent: *Apr. 19, 2016**

(54) RETAIL ITEM MANAGEMENT USING WIRELESS SENSOR NETWORKS

(71) Applicant: TYCO FIRE & SECURITY GMBH, Neuhausen am Rheinhall (CH)

(72) Inventor: Paul Brent Rasband, Lantana, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 392 days.

This patent is subject to a terminal disclaimer.

(21) Appl. No.: 13/847,216

(22) Filed: Mar. 19, 2013

(65) Prior Publication Data

US 2013/0249692 A1 Sep. 26, 2013

Related U.S. Application Data

(60) Provisional application No. 61/613,048, filed on Mar. 20, 2012, provisional application No. 61/613,333, filed on Mar. 20, 2012.

(51) Int. Cl.

| | |
|---|---|
| ***G08B 13/14*** | (2006.01) |
| ***G08B 13/24*** | (2006.01) |
| ***G06Q 30/06*** | (2012.01) |
| *H04W 4/00* | (2009.01) |
| *A01B 1/00* | (2006.01) |
| *G08B 25/10* | (2006.01) |

(52) U.S. Cl.

CPC ........ *G08B 13/2465* (2013.01); *G06Q 30/0639* (2013.01); *H04W 4/006* (2013.01); *A01B 1/00* (2013.01); *G08B 13/2462* (2013.01); *G08B 25/10* (2013.01); *H04W 4/00* (2013.01)

(58) Field of Classification Search

CPC ........................................................ H04W 4/00

See application file for complete search history.

(56) References Cited

U.S. PATENT DOCUMENTS

| | | | | |
|---|---|---|---|---|
| 6,208,247 | B1 | 3/2001 | Agre et al. | |
| 6,662,099 | B2 | 12/2003 | Knaian et al. | |
| 7,076,211 | B2 | 7/2006 | Donner et al. | |
| 7,590,098 | B2 | 9/2009 | Ganesh | |
| 8,089,910 | B2 | 1/2012 | Doh et al. | |
| 8,258,956 | B1 * | 9/2012 | Kuzma et al. | 340/572.1 |
| 2007/0195703 | A1 | 8/2007 | Boyajian et al. | |
| 2008/0084304 | A1 | 4/2008 | Yarvis | |

(Continued)

OTHER PUBLICATIONS

Final Office Action dated Jan. 29, 2015, U.S. Appl. No. 113/847,229, filed Mar. 19, 2013, consisting of 36 pages.

*Primary Examiner* — Shirley Lu

(74) *Attorney, Agent, or Firm* — Alan M. Weisberg; Christopher & Weisberg, P.A.

(57) ABSTRACT

A system for identifying handling events of an item is provided. The system includes at least one wireless sensor node, WSN, tag associable with the item. The WSN tag includes a transceiver and at least one sensor. The at least one sensor is configured to generate sensor data based at least in part on motion of the wireless sensor node. The WSN tag includes a memory configured to store at least one event filter and the sensor data. The WSN tag further includes a tag processor that is configured to filter the sensor data based on the at least one event filter. The tag processor is configured to determine whether an event occurred based on the filtering of the sensor data and generate event data in response to determining an event occurred. The tag processor is configured to cause the transceiver to transmit the event data.

7 Claims, 8 Drawing Sheets

(56) References Cited

U.S. PATENT DOCUMENTS

2008/0164979 A1 7/2008 Otto
2008/0309481 A1 12/2008 Tanaka et al.
2009/0021858 A1 1/2009 Fu et al.
2010/0141423 A1 6/2010 Lin et al.
2010/0176952 A1 7/2010 Bajcsy et al.
2010/0201535 A1* 8/2010 Heo et al. .................. 340/686.1
2011/0063112 A1 3/2011 Oishi
2011/0064026 A1 3/2011 Niedermeier et al.
2011/0158331 A1 6/2011 Kavaler et al.
2011/0191496 A1 8/2011 Luo et al.
2012/0083705 A1 4/2012 Yuen et al.
2012/0109872 A1 5/2012 Havinga et al.
2012/0323807 A1 12/2012 Sabeta
2014/0039274 A1 2/2014 Sarrafzadeh et al.

* cited by examiner

68

| Tag ID | Tag State | Date/Time | Reportable? | |
|---|---|---|---|---|
| 8A-34-44-A6 | 0x10FF (Handling 256) | 2011-5-19, 21:34, 56.4 | Yes | 70 |
| 8A-34-6D-42 | 0x1006 (Handling 7) | 2011-5-19, 21:34, 56.4 | Yes | 72 |
| 8A-34-6D-47 | 0xFF68 (Battery Low) | 2011-5-19, 21:34, 42.8 | Yes | 74 |
| 8A-24-8A-36 | 0x5100 (Outside Area) | 2011-5-19, 21:34, 40.3 | Yes | 76 |
| 8A-34-6D-C1 | 0x1003 (Handling 4) | 2011-5-19, 21:34, 56.1 | No | 78 |
| 8A-34-6D-C3 | 0x1000 (Handling 1) | 2011-5-19, 21:34, 12.4 | No | 80 |
| 8A-34-49-17 | 0xFEA2 (MIA) | 2011-5-19, 21:34, 33.7 | No | 82 |
| 8A-56-AC-87 | 0xFEA2 (MIA) | 2011-5-19, 21:34, 48.2 | No | 84 |
| 8A-22-B5-0D | 0xFEA2 (MIA) | 2011-5-19, 21:34, 27.8 | No | 86 |

*FIG. 8*

RETAIL ITEM MANAGEMENT USING WIRELESS SENSOR NETWORKS

CROSS-REFERENCE TO RELATED APPLICATION

This application is related to and claims priority to U.S. Provisional Application Ser. No. 61/613,048, filed Mar. 20, 2012, entitled INVENTORY MANAGEMENT SYSTEM USING EVENT FILTERS FOR WIRELESS SENSOR NETWORK DATA and U.S. Provisional Application Ser. No. 61/613,333, filed Mar. 20, 2012, entitled RETAIL ITEM MANAGEMENT USING WIRELESS SENSOR NETWORKS, the entirety of both of which are incorporated herein by reference.

STATEMENT REGARDING FEDERALLY SPONSORED RESEARCH OR DEVELOPMENT n/a

FIELD OF THE INVENTION

The present invention relates generally to retail item management and more specifically to a wireless sensor node tag-based method and system for retail item management.

BACKGROUND OF THE INVENTION

In retail stores, items of high value and popularity are often promoted using displays in special locations of high visibility inside the retail store. These special locations often include ends of aisles or on countertops inside particular departments at which consumers are likely to interact with the special items. For various reasons, retailers are intensely interested in the level and nature of human activity surrounding the special items, in particular, the physical handling of these items. One source of interest to retailers is the concern of potential theft of the item. Another aspect of interest to retailers deals with how the handling of the item correlates with the presentation and offering of the item. For example, retailers may want to know whether the price and placement of the item, coupled with all of the influencing factors such as advertising, store lighting and store-wide sales promotions have resulted in a net increase or decrease in the amount of physical attention that the retail demo item garners. This is particularly true for certain high-value or high-interest items, or promotional items which have special correlation with general store performance or sales of a particular store department.

Some retailers employ tethers such as wires and cables attached to retail items on display in order to protect specially displayed retail items and collect motion data. For example, a security device may be tethered to a retail item on display in which a wire or set of wires conveys motion data of the item to a computer hidden under or inside the display fixture surface. However, tethers are often unsightly, and make handling of the tethered retail item awkward.

While point of sale (POS) data is readily available to retailers, it is difficult to use POS data to determine whether item placement in a store is good or bad. For example, reviewing POS data is often not a good indicator of item placement since price has such a profound influence on the decision to buy. The decision to investigate and the decision to buy are very different, i.e., these decisions are dependent on different factors. In other words, it is very difficult to measure how an item is being handled inside the retail store because this information is independent of POS data. While video surveillance can be used in some cases to monitor customer behavior, it is difficult to implement in a manner which allows for automated determination of specific customer behavior such as the handling of a given retail item. In general, such implementations of video surveillance technology are labor-intensive, complex, and expensive.

Another source of interest that a retailer might have in the direct physical handling of retail items within a store has to do with deployment of sales associates. For example, retailers want their sale employees to spend a relatively large amount of their time dealing face-to-face with the shopper who is most interested in the high-profile retail item on display. However, at the present time, the retailer must rely upon high levels of staffing to assure that shoppers will have an opportunity to deal face-to-face with a store associate at the time of the buying decision. While using a large number of store associates on the sales floor at any one time may increase the amount of face time store employees have with shoppers, high-staffing levels have the disadvantage of high labor costs and training.

SUMMARY OF THE INVENTION

The present invention advantageously provides a method and system for retail item management using wireless sensor nodes.

According to one embodiment, a system for identifying handling events of an item is provided. The system includes at least one wireless sensor node, WSN, tag associable with the item. The WSN tag includes a transceiver and at least one sensor. The at least one sensor is configured to generate sensor data based at least in part on motion of the wireless sensor node. The WSN tag further includes a memory that is configured to store at least one event filter and the sensor data. The WSN tag further includes a tag processor that is configured to filter the sensor data based on the at least one event filter. The tag processor is further configured to determine whether an event occurred based on the filtering of the sensor data and generate event data in response to determining an event occurred. The tag processor is further configured to cause the transceiver to transmit the event data.

According to another embodiment, an analytics device for retail item management is provided. The analytics device includes an analytics processor that is configured to track changes in wireless sensor node, WSN, tag states based at least in part on tag state change data. The tag state change data corresponds to changes in WSN tag states. The analytics processor is further configured to generate an alert if the tag state change data meets a reporting threshold. The reporting threshold is based at least in part on WSN tag motion indicated by the tag state change data.

According to another embodiment, a method for identifying handling of an item is provided. Sensor data is generated based at least in part on motion of a wireless sensor node associable with the item. At least one event filter and the sensor data is stored. The sensor data is filtered based on the at least one event filter. A determination is made whether an event occurred based on the filtering of the sensor data. Event data is generated in response to determining the event occurred. The event data is transmitted.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 8 is a list of reportable and non-reportable wireless sensor node (WSN) tag state changes in accordance with the principles of the present invention.

DETAILED DESCRIPTION OF THE INVENTION

Figure 1:
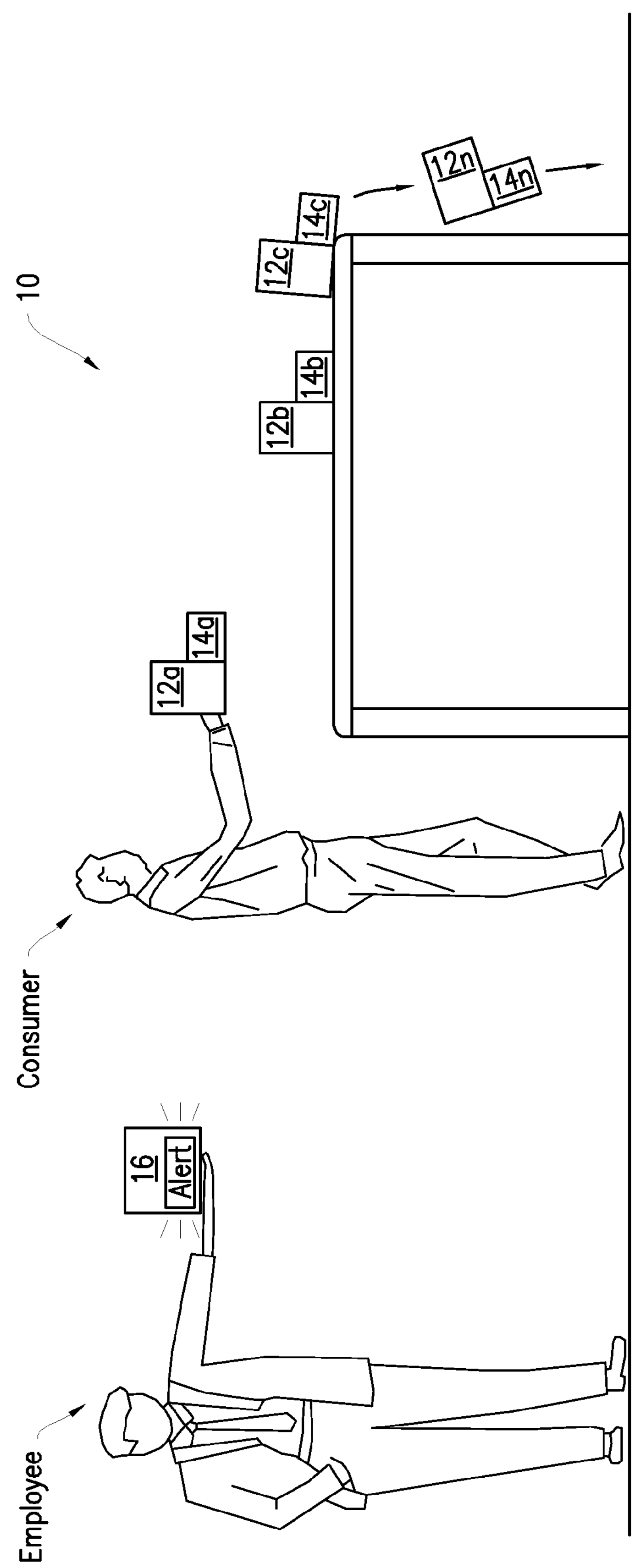
FIG. 1 is a diagram of an exemplary item management system in use or constructed in accordance with the principles of the present invention.

Before describing in detail exemplary embodiments that are in accordance with the present invention, it is noted that the embodiments reside primarily in combinations of apparatus components and processing steps related to implementing a system and method for retail item management. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. While, one or more embodiments herein suggest co-location of apparatus components inside the same housing, system, or site location, the invention is not limited to such. Actual deployment of may involve greater distribution of components and functionality around and among different physical devices, some of which may be remotely accessible such as via the Internet or internal network, or a combination of these networks. While one or more embodiments described herein have been simplified for the sake of clarity, the instant invention may include more highly distributed embodiments which involve the same general components and functionality.

As used herein, relational terms, such as “first” and “second,” “top” and “bottom,” and the like, may be used solely to distinguish one entity or element from another entity or element without necessarily requiring or implying any physical or logical relationship or order between such entities or elements.

Referring now to the drawing figures in which like reference designators refer to like elements there is shown in FIG. 1 an exemplary system wireless sensor node (WSN) tag system constructed in accordance with the principles of the present invention and designated generally as “10.” System 10 includes one or more items 12*a* to 12*n* (collectively referred to as “item 12”), one or more WSN tags 14*a* to 14*n* (collectively referred to as “WSN tag 14”) and one or more user devices 16 (collectively referred to as “user device 16”). In particular, a consumer is illustrated interacting with item 12*a* in which WSN tag 14*a* senses the motion and determines whether the motion should be reported as described in detail with respect to FIG. 4. Furthermore, WSN tag 14*n* may sense motion of item 12*n* falling to the floor but does not report the motion as the motion does not meet the event filter as described in detail with respect to FIG. 4. In other words, WSN tag is programmed to report predetermined motions events that are important to the retailer based on filter parameters, i.e., motion events indicating a consumer is interest in item 12. Furthermore, a notification may be sent to user device 16 based on the motion sensed by WSN tag 14*a* such that an employee is able to increase face-to-face time with a consumer that is showing actual interest in item 12*a*.

Figure 2:
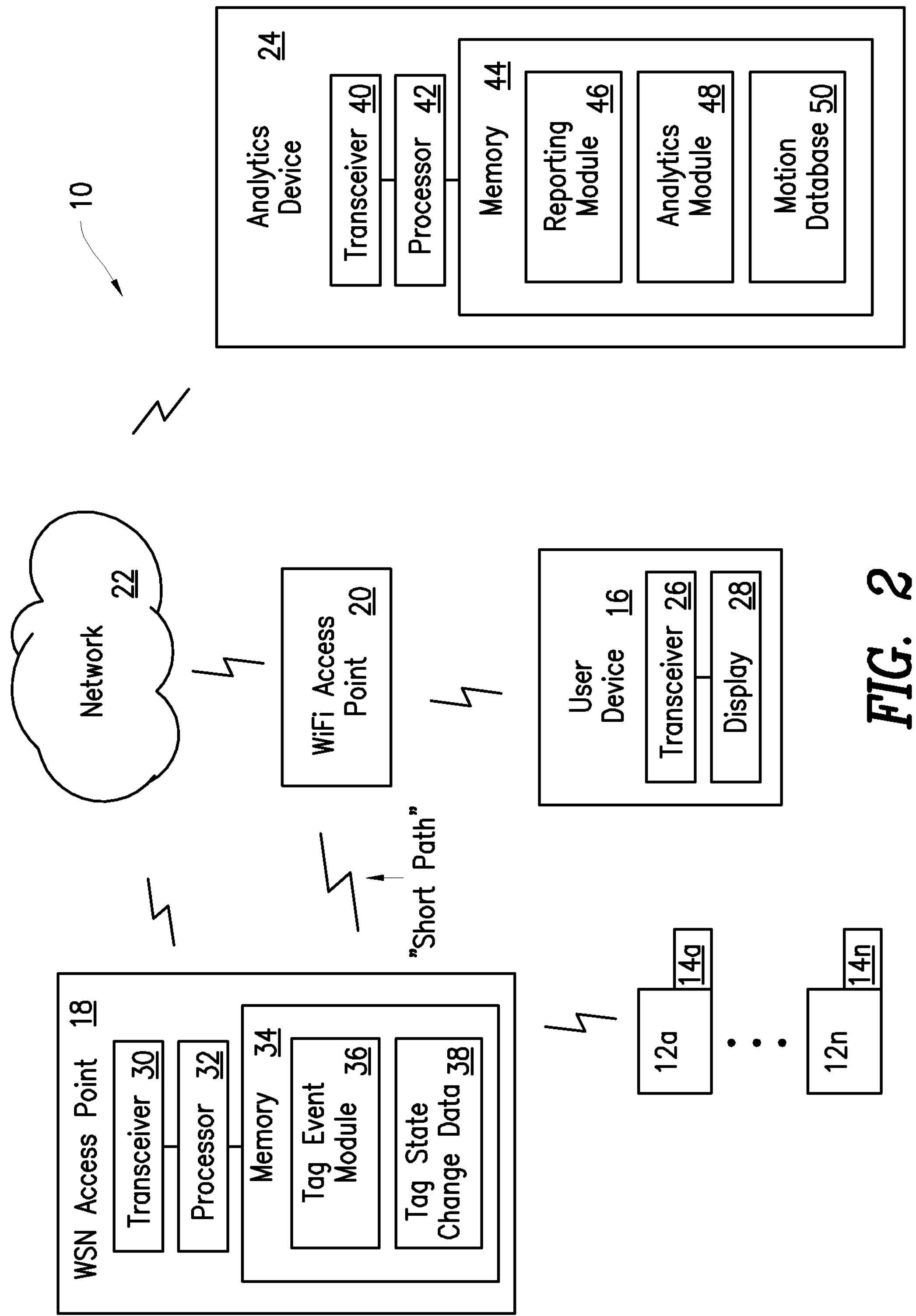
FIG. 2 is a block diagram of an exemplary item management system constructed in accordance with the principles of the present invention.

FIG. 2 is a block diagram of system 10. System 10 includes item 12, WSN tag 14, user device 16, one or more WSN access points 18 (collectively referred to as “WSN access point 18”), one or more Wi-Fi Access points 20 (collectively referred to as “Wi-Fi access point”), one or more networks 22 (collectively referred to as “network 22”) and one or more analytics devices 24 (collectively referred to as “analytics device 24”). Item 12 may be a retail item or article. In one embodiment, WSN tag 14 is approximately one-third the size of a standard business card and is attached to item 12 being displayed and monitored. In particular, WSN tag 14 is removably affixed to item 12 via methods known in the art such as via pin/lock. WSN tag 14 is described in more detail in FIG. 3.

User device 16 may be a mobile device for use by an employee in which the mobile device receives alerts and/or reports generated by system 10. For example, user device 16 may be a Smartphone, tablet computer or personal digital assistant (PDA), among other mobile devices that can receive and display alerts and/or reports generated by analytics device 24 and/or WSN access point 18. In particular, user device 16 includes transceiver 26 for communicating with Wi-Fi access point 20, among other devices in system 10. User device 16 also includes display 28 for displaying a received alert or report to an employee operating user device 16.

WSN access point 18 includes transceiver 30 that provides communication to and from WSN tag 14 in which WSN access point 18 is co-located with WSN tags 14 in the retail store, e.g., separated by no more than several hundred feet to support short-range radio communication. WSN tags 14 form a sub-network that can access and be accessed by the WSN access point 18 in which WSN tags 14 may be governed by multi-layer communications protocols such as IEEE 802.15.4 media access control with Zigbee or 6LoWPAN for network management and message routing, among other communication protocols designed to achieve the same functions of the above cited standard layers. WSN access point 18 may transmit on a “short path” directly to Wi-Fi access point 20 as is described in detail with respect to FIG. 5. Transceiver 30 can be a separate transmitter and receiver but are described herein as a “transceiver” for efficiency and ease of understanding. System 10 may include additional WSN network elements, such as repeater nodes (not shown), designed to extend the physical range of the network communication, and to store and forward messages in cases where WSN tags 14 or other network nodes are asleep and unable to receive or transmit messages in real-time.

WSN access point 18 includes processor 32 that may be one or more central processing units (CPUs) for executing computer program instructions stored in memory 34. WSN access point 18 includes memory 34 for storing tag event module 36 for tracking and reporting tag state changes and tag state change data 38 based on event data 67 received from WSN tag 14. In particular, WSN access point 18 stores and updates tag state change data 38 in order to track which WSN tags 14 are in new states. For example, tag state change data 38 may include a linked list of the WSN tags 14 in system 10 and a "state changed" flag for each WSN tag 14 in a linked list, among other information related to the changed state of WSN tag 14. For example, tag state change data 38 may include date/time of the event that caused WSN tag 14 to change states, type of state and tag ID as described in more detail with respect to FIG. 8. When WSN tag 14 sends a new state report to WSN access point 18 indicating WSN tag 14 is in a new state, WSN access point 18 records the details of WSN tag 14's new or changed state in the linked list, and sets the state changed flag to "1". Upon the next request from analytics device 24 for new WSN tag 14 states, WSN access point 18 uses the state changed flag to determine which WSN tags 14 have experienced a state change since the previous polling request from analytics device 24.

After sending the report of WSN tag 14 with new states to analytics device 24, WSN access point 18 resets the state changed flag to "0". Therefore, WSN access point 18 tracks WSN tag 14 state changes. If more than one analytics device 24 polls WSN access point 18, WSN access point 18 may assign a service requester identification (ID) number for each subscribing analytics device 24, and may maintain a separate state changed flag for each of the subscribing analytics devices 24. The manner in which WSN tag 14 updates state information with WSN access point 18 inside the WSN, and in which WSN access point 18 updates state information with external devices (LAN or WAN based), such as analytics device 24,may be governed by web service based publisher/subscriber techniques. More particularly, RESTful web services utilizing hypertext transfer protocol ("HTTP") or constrained application protocol ("CoAP") message transport functionality may be used, among other applications and web-service implementation technologies. Memory 34 may include non-volatile and volatile memory. For example, non-volatile memory may include a hard drive, memory stick, flash memory and others known in the art. While volatile memory may include random access memory and others known in the art. Wi-Fi access point 20 provides communication to and from user device 16.

Analytics device 24 polls access point 18 for tag state change data and generates reports based on the received tag state change data 38. Analytics device 24 includes transceiver 40, processor 42 and memory 44. Transceiver 40 provides communications to and from analytics device 24. For example, transceiver 40 transmits polling commands to WSN access point 16 via network 22 and receives tag state change data 38 from WSN access point 16. Processor 42 may be one or more central processing units (CPUs) for executing computer program instructions stored in memory 44. Memory 44 may function substantially the same as corresponding memory 30, with size and performance being adjusted based on design need. Memory 44 includes reporting module 46, Analytics module 48 and motion database 44. Reporting module 46 includes instructions, which when executed by processor 42, causes processor 42 to perform the reporting process discussed in detail with respect to FIG. 7. Analytics module 48 includes instructions, which when executed by processor 42, causes processor 42 to perform the analytics process discussed in detail with respect to FIG. 6. Motion database 50 stores tag state change data 38 and reports associated with WSN tag 14 state changes, among other WSN tag 14 related information. Network 22 may be a wide area network (WAN) such as the Internet, local area network (LAN), Ethernet LAN, cellular communication network, public switched telephone network (PSTN), Wi-Fi network, or combination of any of these network types, among other protocol based networks.

Figure 3:
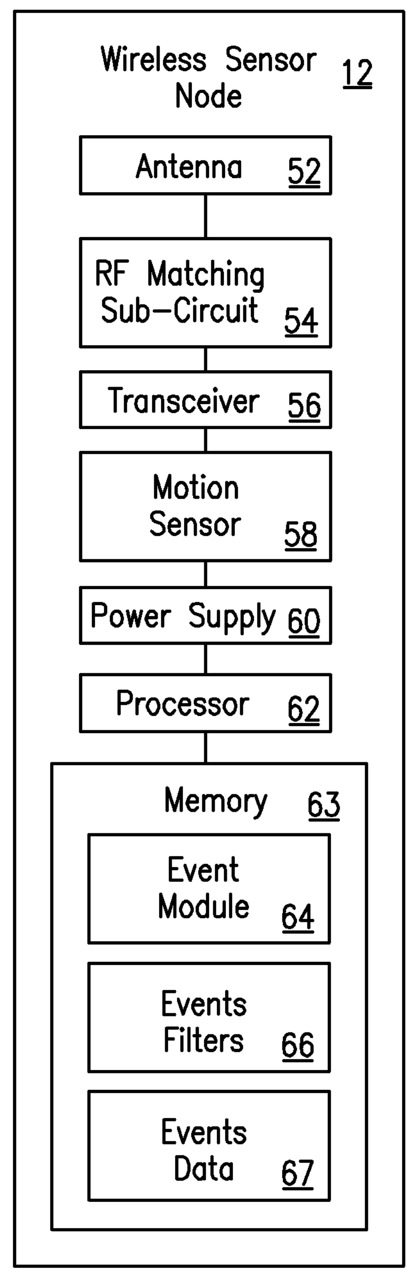
FIG. 3 is a block diagram of an exemplary wireless sensor node tag constructed in accordance with the principles of the present invention.

FIG. 3 illustrates an exemplary block diagram of WSN tag 14. WSN tag 14 includes antenna 52, radio frequency (RF) matching sub-circuit 54, transceiver 56, motion sensor 58, power supply 60, processor 62 and memory 63. Transceiver 56, processor 62 and memory 63 may function substantially the same as corresponding analytics device 24 components, with size and performance being adjusted based on design needs. In particular, processor 62, i.e., tag processor, may run tag management software or firmware that is configured with filter firmware to filter the sensor data based on the at least one event filter.

Transceiver 56, RF matching sub-circuit 54 (that may include a balun chip) and antenna 52 provide communications with WSN access point 18 such as to transmit event data 67 to WSN access point 18. Motion sensor 58 may be a contact sensor or three-axis accelerometer, among other motion sensing devices.

Memory 63 stores event module 64 and event filters 66. Event module 64 includes instructions, which when executed by processor 62, causes processor 62 to perform the event process discussed in detail with respect to FIG. 4. Event filters 66 include one or more filter parameters corresponding to one or more filters that are used to determine whether an event occurred. In particular, event filters 66 include firmware instructions, e.g., executable programmatic code instructions stored in memory 63 and at least one filter parameter such as formula coefficients, exponents and/or other formula required values. Event filters 64 may also include special data structures or groupings of data elements designed to facilitate processing and communication of data sets. In other words event filter 66 takes as input raw sensor data and processor as output as "decision" or declaration as to whether a particular event has occurred in which event has special significance is mathematically defined in the details of event filter 66.

Event filter 66 may be downloaded from analytics device 24 via WSN access point 18 such that event filter 66 of WSN tag 14 may be dynamically updated or replaced. In particular, WSN tag 14 may have different event filters 66. Memory 63 may also store event data 67 associated with a tag event. Power supply 60 may be a battery such as a coin cell battery and power-supply sub-circuit. Alternatively, power supply 60 may be an energy harvesting module. WSN tag 14 may also include a light emitting diodes (LEDs) and/or piezoelectric resonator (not shown) to generate a hearable audio signal. Memory 63 and processor 62 may be co-located on a single microcontroller ("MCU") chip. In one embodiment, the sensor data may be processed directly without storage of the sensor data in memory 63. Alternatively, sensor data may be stored in memory 63.

WSN tag 14 may periodically wake to transmit a tag event or may operate in low power mode where only the radio and other control circuitry are active in order to detect polling commands from WSN access point 18. Further, processor 62 of WSN tag 14 may wake up due to sensed motion from motion sensor 58. In other words, WSN tag 14 may "sleep" to conserve power until a condition occurs that causes WSN tag 14 to wake up.

Alternatively, WSN tag 14 may be a "dumb" tag that reports all motions sensed by motion sensor 58 such that WSN tag 14 does not perform filtering or performs minimal filter, i.e., reports motion above a predetermined threshold. Analytics device 24 would perform the filtering (described in detail with respect to FIG. 4) of sensor data received from WSN tag 14, i.e., event module 64 and event filters 66 are stored in memory 44. WSN tag 14 would report raw data to analytics device 24 for filtering. In other words, this centralized filtering approach helps simplify WSN tag 14 design, thereby reducing WSN tag 14 cost. However, this centralized filtering approach may also increase network traffic as large amounts of raw data may be generated by numerous WSN tags 14 inside the WSN such that the actual number of WSN tags 14 that may be deployed in this approach is limited.

Figure 4:
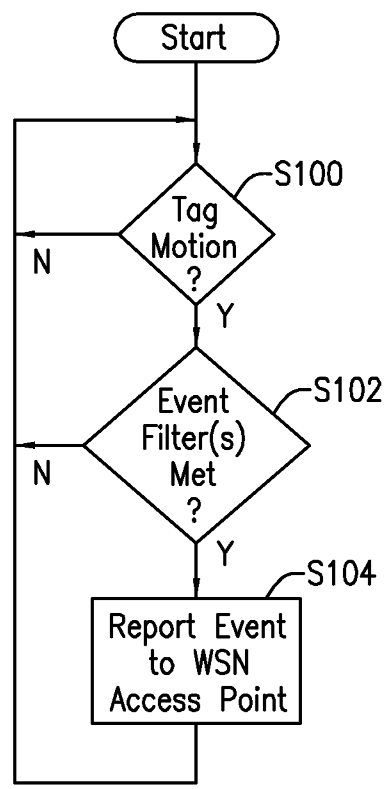
FIG. 4 is a flow chart of an exemplary event determination process in accordance with the principles of the present invention.

FIG. 4 illustrates an exemplary flow diagram of the event determination process at WSN tag 14 in which WSN tag 14 is associated with an item ID of item 12. In particular, processor 62 may receive the event filters or filter parameters via wireless message using over-the-air firmware upgrading or reprogramming techniques. In particular, the downloading of event filters and/or filter parameters may or may not require re-initialization or re-booting of WSN tag 14, i.e., processor 62, depending on the nature of the operating system software running on processor 62. In one embodiment, WSN tag 14 may receive event filters from analytics device 24 after processor 62 has already been initialized and commenced normal operation, and in which WSN tag 14 processor's operating system updates event filters 66 with the received filter parameters. Filter parameters or event filters, i.e., formulas and/or functions to processor raw sensor data and declare tag events, of WSN tag 14 may be dynamically updated or replaced at substantially any time due to received filter parameters, filter firmware and an associated command to update the event filter 66. Processor 62 determines whether tag motion has occurred based at least in part on data received from motion sensor 58 (Block S100). For example, processor 62 determines tag motion occurred if a predefined threshold is met. The threshold may be 3D based thresholds such that 3D accelerometer data in X, Y and/or Z directions is used to determine motion has occurred, i.e., the thresholds are minimum acceleration values, and the accelerometer reports acceleration data to processor 62 which can be compared to the threshold. If processor 62 determines no tag motion has occurred, processor 62 repeats the determination of Block S100.

If processor 62 determines that tag motion has occurred or is still currently occurring, processor 62 determines whether at least one event filter 66 is met (Block S102). Each event filter includes and is defined by a number of filter parameters or thresholds that must be met in order to determine an event occurred. The event filters or filter parameters are designed to be implemented in WSN tag 14 having a small memory storage capacity, yet be complex enough to capture the salient characteristics of item 12 handling. The types of event filters implemented by WSN tag 14 fall into at least two general categories: thin filtering filters and thick filtering filters. Thin filters are event filters at WSN tag 14 that report simple events more often than thick filters. Thick filters are event filters that report a smaller number of complex events.

One type of event filter is a first event filter that corresponds to specific filter parameters in which the first event filter is the least computationally complex filter. When processor 62 applies the first event filter, processor 62 counts the number of movements X above a predefined threshold, e.g., acceleration value above a certain acceleration threshold value, in a predefined time Y, where X and Y are positive values. In cases where the accelerometer sensor itself employs internal filters of its own, movements X can correspond to one or more number of different types of motions sensed by motion sensor 14 such as a tap, translation above X, Y, or Z-translation acceleration threshold, tilting and torquing, among other motions that may be sensed by motion sensor 14. In more limited situations where sensor 58 has no internal filter such that filtering is done on the raw sensor data after the raw sensor data is reported to processor 62 by sensor 58, the raw sensor data involves only limited data such as X, Y and Z-translation acceleration. In translational acceleration threshold filtering for motion in dimension X, if the value of X, e.g., 0.1 gravitational ("g") force, is above the predefined threshold, processor 62 determines movement X has occurred. The first event filter may be expressed in equation form as:

$F_1=[\Sigma X\rightarrow\theta]_Y$ where ΣX is the sum of movements X with acceleration values exceeding the acceleration threshold θ, and Y is the threshold time. For example, if the acceleration threshold is 0.2 g's and there are five movements X of force greater than 0.2 g in five seconds, and the time threshold value Y equals six seconds, then the filter result is "true" and the filter declares the event, i.e., filter satisfied" event.

In one embodiment, movements X may correspond to a complex combination of one or more of the above listed different types of motions. For example, movements X may be tilting movements, i.e., X=T, in which the first event filter may be expressed as:

$F_1=[\Sigma T\rightarrow\theta]_Y$ where ΣT is the sum of tilting movements in any plane, θ is the threshold value expressed, for example, in degrees relative to some orientation plane for ΣT, and Y is the threshold time. One possible set of filter parameters for the first event filter may be θ=5, T=30 degrees and Y=60 seconds in which five movements of greater than 30 degrees must occur within sixty seconds for the event filter to be met.

A more explicit way of expressing this filter, $F_1$, is to show that all tilting movements that are counted in the sum are above a predefined tilt threshold $T_m$, i.e., tilt angle. The first event filter with the predefined tilt threshold $T_m$ may be expressed as: $F_1=[\Sigma T_{(T>Tm)}\rightarrow\theta]_Y$. The first event filter is a thin filter if X is small and/or θ is small, and Y is large.

Another type of event filter is a second event filter that automatically changes filter parameters, i.e., is self adapting, based at least in part on the number of events WSN tag 14 has reported to WSN access point 18, i.e., number of times WSN tag 14 has fired. The second event filter is express as:

$F_2=[\Sigma T\rightarrow\theta]_Y$ and $\theta=\theta(\Sigma F)=m*\Sigma F$ where ΣF is the total number of times (since filter reset) that the filter has fired, and m is a constant. In other words, the second event filter fires like the first event filter but will not fire again (prior to reset) for a handling event of the same intensity, but requires an increased handling intensity after each fire, i.e., θ increases after each firing. The second event filter advantageously allows system 10 to capture the first primary event or firing, and then capture any increases in intensity of handling of item 12, without flooding the sensor network communication channels, e.g., network 22, with redundant reports of continued handling at the initial intensity.

Another type of self adapting event filter is a third event filter that automatically changes filters parameters based at least in part on firing or events reported by WSN tag 14. The third event filter is expressed as:

$F_3=[\Sigma T\rightarrow\theta]_Y$; $Y=Y(\Sigma F)=Y_o*[1+\Sigma F]^k$ where $Y_o$ is the initial value of the time threshold, and k is a constant. If k is small and positive (between 0 and 1, closer to 0), then Y increases slowly with each filter firing. However if k is large (k>2), then Y increases very rapidly with each filter firing. If k is negative, then the time limit Y is shortened, slowly or quickly, depending on the magnitude of k, after each filter firing event. The third event filter may be used when retailer put more importance on the first firing event than motion occurring over time. For example, the retailer may implement the third event filter if it is very important to know the first time motion occurs above the threshold, and less important, though not unimportant, to know that motion is occurring over time. In the case of retail item management, analytics device 24 may be notified as soon as a retail item is handled above a certain threshold, e.g., 3 tilts in 25 seconds. If another 3 tilts occurs in the next 25 seconds, the second event may not be as interesting as the first event since analytics device 24 already knows the item is being handled. However, retailers may want to know if the next 3 tilts occur within the next 10 seconds, not 25 seconds, in which constant m can be properly chosen such that the second filter firing occurs due to a high intensity handling event.

Another event filter is a fourth event filter that tapers the "turning off" of the filter to match real-world handling of item 12. For example, fourth event filter includes a filter counter that starts at 0, and increments (+1) if motion above threshold θ occurs. Anytime that the counter is greater than 0, a timer t is running. If the timer t reaches a predefined time limit Y prior to another motion above threshold, the counter is decremented (−1) and the timer is reset. If the counter reaches 0, the timer is reset but does not start again until there is another motion event above threshold. However, if the filter counter reaches some threshold θ at any time, the filter is satisfied, i.e., the event trigger filter firing and the event is reported.

Another event filter is a composite event filter that includes at least two event filters of the same and/or different filter type. One variation of the composite event filter is a series composite filter in which firing of a first filter disables the first filter and enables the second filter in the series. Firing of the second filter disables the second filter and enables a third filter in the series, and so on until the final filter fires. After the final filter fires, the final filter is disabled and the first filter is enabled such that the process repeats. For example, firing of first event filter ($F_1$) enables the second event filter ($F_2$) while also disabling the first event filter ($F_1$). For example, a consumer may pick up and handle an item causing at least 5 motions X within 10 seconds such that the first event filter fires, i.e., is triggered, and then is disabled. The consumer may continue to handle the item but may start to intently examine the item thereby causing higher intensity firings over the next 10 seconds such that the second filter fires causing a tag event to be reported.

A second variation of the composite event filter is a parallel composite filter. In the parallel composite filter, at least two event filters are grouped together in a set, and firing by one of the event filters in the set constitutes firing of the set. For example, the first event filter ($F_1$) and second event filter ($F_2$) may be grouped together in parallel in which firing of either filter constitutes firing of the set. For example, filter $F_1$ might be triggered after detection motion for X seconds while a second filter might be triggered after motion is detected for X+Y seconds from the initial motion. A consumer may pick up item 12 and start intensely handling the item 12, i.e., inspects the item from all angles, such that the second event filter that has time threshold of 30 seconds is triggered after the first event filter with a time threshold of 10 seconds, with both time thresholds being based on the same starting point in time. The tag event is then reported.

A third variation of the composite event filter is a series-parallel compose filter that includes at least three event filters in a series/parallel configuration. For example, the first event filter, $F_1$, may be in series with a set of parallel filters ($F_2$, $F_3$, $F_4$) in which the set of filters are inactive until the first event filter fires. After the first event filters fires, the set of filters ($F_2$, $F_3$, $F_4$) are activated and the first event filter is deactivated. Firing of either $F_2$, $F_3$ or $F_4$ will cause a report or event data 67 to be transmitted to WSN access point 18. For example, a consumer may pick up item 12, examine the item and put item 12 back down, thereby triggering first event filter which will disable the first event filter and enable the parallel set of filters. The consumer may then pick up item 12 for a second item as if still trying to decide whether to purchase item 12 in which the handling of item 12 the second time around is more intense, i.e., the consumer lifts the item up in order examine under item 12. The examination causes the second event filter to trigger before the third and fourth event filters such that the event is reported and the set of parallel event filters are disabled, the first event filter is enabled. The series/parallel filter set approach is suited to defining complex motions of items which involve alternating acceleration and turning/tilting of items. For example, an initial translational acceleration followed by a series of tilting changes may be characteristic of item "pick up and examination" whereas a series of repeated (cyclical) translations and tilting my indicate examination of an item by a group of two or more people. Additionally, a series/parallel arrangement of filters based on infrequent but significant large in the X and Y directions but very frequent and smaller accelerations in the Z direction may be indicative of a person walking with an item in their possession.

Although the parallel, serial and composite event filters are described with reference to a single WSN tag 14, the invention is not limited to such. It is contemplated that the determination of the parallel, serial and composite triggering can be made by WSN access point 18 or analytics device 24 using filters in those devices based on sensor data provided by multiple WSN tags 14 or based on the firing of a set of filters in a single WSN tag 14. Furthermore, when a set of WSN tags 14, each with its respective internal series/parallel set of filters is employed to monitor a collection of retail items 12, the filter events from one tag may influence the activation and deactivation of filters or subsets of filters in other (adjacent) WSN tags 14. Such activation and deactivation of filters in adjacent WSN tags 14 provides added utility in monitoring the activity in a particular part of a retail store in which WSN tag 14 activity beyond a certain intensity, with numbers of retail items 12 greater than a predefined small number, is not of great business importance since the store employee's response is not influenced by the additional event reporting. In other words, this "super-filter" may include filter sets from multiple WSN tags 14 and may thus have a single "event declaration" associated with it by the WSN access point or analytics device.

Another event filter is a learning mode event filter. The learning mode event filter counts motion events and time intervals, and uses a pre-programmed function form with regression analysis or rules to determine its own parameters or selects from a list of pre-programmed parameters options (e.g., best-fit Y and θ values). Once filter parameters are selected or determined, the filter parameters are used when WSN tag 14 is placed in normal activity mode. A variation of the learning mode approach is when one of WSN tags 14 is instructed by WSN access point 18 or analytics device 24 to transmit raw motion sensor 58, i.e., cease all filtering. In particular, WSN tag 14 may receive a command to report every slight movement (X>Xm for a small value of m) in which the analytics device 24 or other network entity uses the raw data to select an event filter and corresponding filter parameters that best fit the raw data.

For example, the WSN tag set may include individual WSN tags 14 located at fixed positions along the walls, posts, shelf supports, and other fixed points along the normal walkways inside the retail store. These WSN tags 14 may include proximity sensors (not shown) which detect when a person walks past or approaches inside a certain distance. During the sensor network training period, the tags are instructed to send all detectable sensor readings, i.e., readings above noise level, to WSN access point 18 via the wireless network. During the same period of time, employees are assigned to count the number of people walking up and down each aisle, either exhaustively or according to some statistics based sampling formula. Afterwards the raw proximity sensor data from the network of WSN tags 14 is compared with the eye-witness data to determine which filters and filter parameter values can best fit the actual store traffic data. The fitted filters can then be used subsequently and trusted to yield accurate reports of store customer traffic without the need for on-site employee observation. Similar examples could be used to determine which filters and filter parameter sets best fit the "meaningful types of item handling" for the accelerometer based filters described above.

Analytics device 24 and/or WSN access point 18 may then transmit the selected event filter and filter parameters to WSN tag 14 and instruct WSN tag 14 to implement to selected event filter and leave the learning mode, i.e., enters normal activity mode using the selected event filter. Along with transmitting or stream raw data, WSN tag 14 may also tag or flag the raw data to indicate whether the handling of item 12 that is initiating the stream is of interest to retailers based on predefined parameters. Alternatively, the tagging or flagging may be done after the fact by reviewing video/closed circuit television (CCT) recordings of the sales floor and watching for item 12 handling. Time stamps or time intervals for these events of interest are matched with the time stamps/intervals for the motion data, and WSN tag 14 raw data stream identified and flagged.

The learning mode filter allows WSN tag 14 to off-load complex modeling to device(s) with greater computational capabilities, i.e., analytics device 24, when the modeling is too complex to be handled by WSN tag 14. The learning mode filter may also be modified to include storage of the raw data from more than one WSN tags 14, sampled over time, in a cloud or local server based database for analysis. The motion database 50 of raw data may be submitted to one or more of a number of different "learning machines" technologies such as fuzzy logic model development engines, neural network analysis, and various types of regression analyses.

Furthermore, WSN tag 14 may select its own filter parameters based upon the level of network activity. For example, if WSN tag 14 tries to deliver a message from a previous event or firing and finds that there is lots of activity on the network, as determined using collision avoidance algorithms such as Carrier Sense Multiple Access with Collision Avoidance (CSMA-CA), WSN tag 14 may modify its own filter parameters to fire the filters more selectively or less often, i.e., may switch event filter types or may modify specific filter parameters. The specific type of self-censoring may be guided by external applications running in WSN access point 18 or analytics device 24, i.e., externally imposed reporting criteria. For example, WSN tag 14 may be instructed to report its "five most extreme" motion events in any 10 minute period, and then WSN tag 14 is left to iteratively modify its own filter parameters until, on average, WSN tag 14's filter reports meet the externally imposed reporting frequency criterion.

Referring back to Block S102, if processor 62 determines an event filter has not been met, processor 62 repeats the determination of Block S100. If processor 62 determines an event filter has been met, processor 62 causes event data 67 associated with the event to be reported to WSN access point 18, i.e., the event filter fires (Block S104). After reporting the event, processor 62 performs the determination of Block S100.

Figure 5:
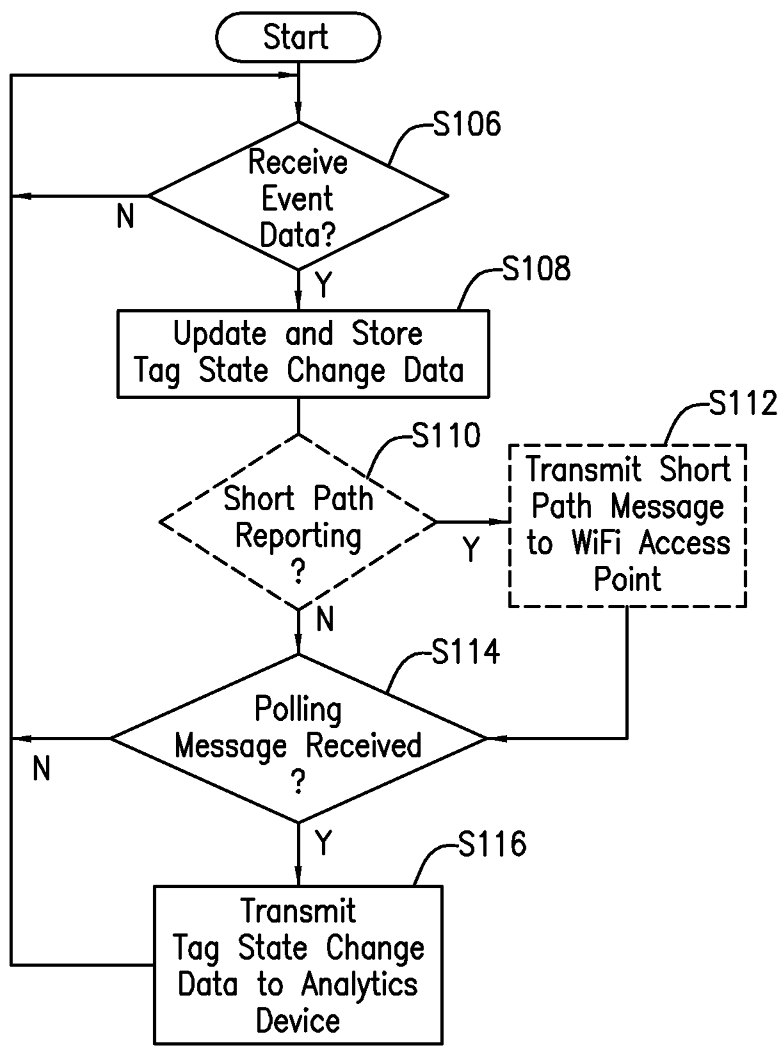
FIG. 5 is a flow chart of an exemplary tag event process in accordance with the principles of the present invention.

An exemplary tag event process is described with reference to FIG. 5. Processor 32 determines whether event data 67 associated with a tag event has been received from WSN tag 14 (Block S106). Event data 67 may include date/time of an event, tag ID, type of event and other information related to event. For example, WSN access point 18 may receive a message indicating WSN tag 14 has detected tag event 70 (FIG. 8) indicating "handling 256" event, as discussed in detail with respect to FIG. 8. If processor 32 determines event data 67 has not been received from WSN tag 14, processor 32 repeats the determination of Block S106. If processor 32 determines event data 67 associated with a tag event has been received from WSN tag 14, processor 32 causes tag state change data 38 to be updated and stored in memory 34 (Block S108). For example, tag state change data 38 may include a linked list of WSN tags 14 that tracks which WSN tags 14 are in a new state and details of the handling event that was reported of by WSN tag 14.

Processor 32 determines whether to perform short path reporting (Block S110). Short path reporting includes transmitting a reporting message directly with any user device 16 on the Wi-Fi network without having to go to network 18 and analytic device 18, i.e., without having to transmit the reporting message to a cloud computing environment or off-site software applications as an intermediary. Whether short path reporting is performed is based at least in part on the nature of the reporting message and tolerability of the reporting message latency, among other factors. For example, short path reporting is not required for some reports that are used for long-term analytics such as understanding how customers are interacting with items 12, for the purpose of understanding the effects of product placement, price, packaging and other merchandising considerations. In one embodiment, soft reports may be included in the long-term analytics type reports and therefore do not require short path reporting. Soft reports are discussed in detail with respect to FIG. 7.

Other reports that are urgent and motivated by the need to respond to a real-time tag event such as a hard reporting event may be reported using short path reporting. For example, a potential theft of item 12 which has moved outside of a predetermined area may require reporting via short path reporting that has less reporting delay due to less device intermediaries. Hard reporting events are described in detail with respect to FIG. 7. If processor 32 determines to short path reporting is required, processor 32 causes transceiver 30 to transmit a short path message to user device 16 via Wi-Fi access point 20. In order for WSN access point 18 to transmit to Wi-Fi access point 20, WSN access point 18 may support at least two wireless protocols and may include two physical radios such as ultra high frequency ("UHF") radio, e.g., industrial, scientific and medical ("ISM") band or 868/915 MHz, for wireless sensor network communication and a 2.4 GHz radio for communication over the Wi-Fi network. Alternatively, WSN access point 18 may use a common radio and protocol for communication within system 10 or user device 16 may be part of the WSN network and adapted to receive short path messages. In some embodiments, user device 16 may itself function as WSN access point 18. In one example, when the retail employee in possession of user device 16 enters a physical region holding a set of WSN tags 14, those WSN tags 14 may detect and associate with the WSN network created by the newly arrived access points provided by user device 16. This embodiment provides added utility since user device 16 can be in direct communication with all WSN tags 14 in the general vicinity of the retail employee best able (in terms of physical availability and reaction time) to respond to local tag filter events.

Referring to the embodiment in which user device 16 and WSN access point 18 are separate devices communicating with each other over a Wi-Fi network, after transmitting the short path message, processor 32 determines whether a polling message has been received from analytics device 24 (Block S114). If a polling message has not been received, processor performs the determination of Block S106. Furthermore, WSN access point 18 may update the flags in tag state change data 38. If processor 32 determines a polling message has been received, processor 32 causes transceiver to transmit event data 67 to analytics device 24 (Block S116). After transmitting event data 67 to analytics device 24, processor 32 performs the determination of Block S106. Referring back to Block S110, if short path reporting is not required, processor performs the determination of Block S114. Alternatively, Blocks S110 and S112 may be skipped or omitted based on design need. As mentioned above, the particular details of the management of polling and response messages may be implemented using techniques such as RESTful web serving, CoAP based messaging, and other open standards based techniques designed to support robust and RESTful (link-stateless) publisher/subscriber communications.

Figure 6:
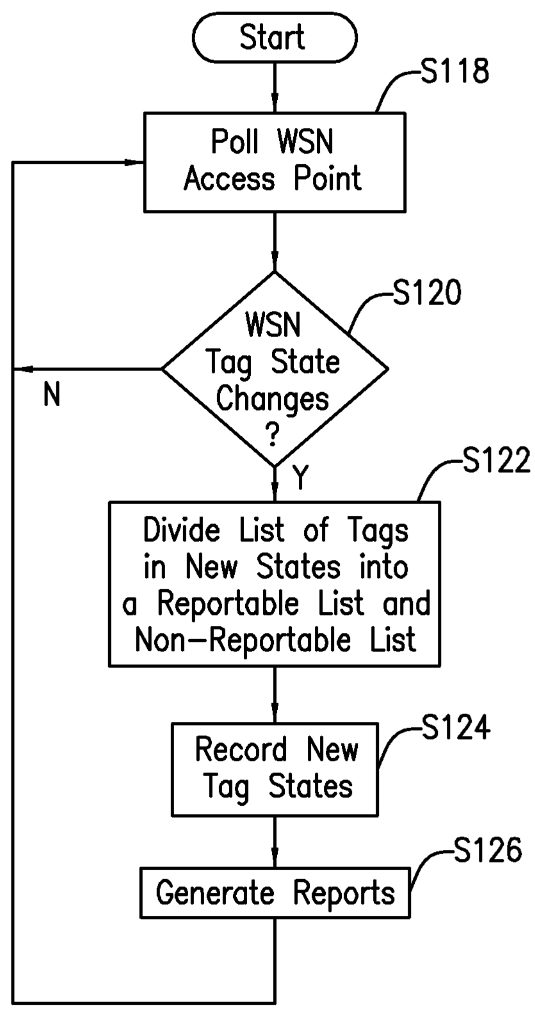
FIG. 6 is a flow chart of an exemplary analytics process in accordance with the principles of the present invention.

An exemplary analytics process for tracking WSN tag 14 states and generating reports is described with reference to FIG. 6. Processor 42 causes WSN access point 18 to be polled (Block S118). For example, analytics device 24 may transmit a polling command to WSN access point 18 requesting tag state change data, i.e., WSN tags 14 that have changed state from the last time the polling command was sent. Processor 42 determines whether WSN access point 18 reports any WSN tag 14 state changes in response to the polling command (Block S120). If processor 42 determines that no WSN tag 14 state changes have occurred, processor 42 returns to Block S118, i.e., analytics device 24 may periodically poll WSN access point 18 for WSN tag 14 state changes.

If processor 42 determines that at least one WSN tag 14 state change has occurred based on received tag state change data 38, processor 42 generates at least two lists of WSN tags 14 that are in new states, i.e., tags 14 that have changed states (Block S122). In particular, one list includes reportable WSN tag 14 states while the other list includes non-reportable WSN tag 14 states. For example, non-reportable WSN tag 14 states require entry into motion database 50 for establishing the existence of WSN tags 14 and for further tracking, the existence of WSN tag 14, by itself, does not require generating a report or alert as predefined by the retailer and/or system 10 administrator. In these cases, WSN tag 14 state change is not significant or does not provide new useful data relating to consumer handling of item 12. Reportable WSN tag 14 state changes are predefined by the retailer and/or system 10 administrator in which the state changes generate a report or alert, i.e., may transmit an alert to an employee's user interface device 16. Processor 42 causes the received WSN tag 14 state changes to be stored in motion database 50 (Block S124). Processor 42 generates report (Block S126). For example, processor 42 performs the reporting process as described in FIG. 7.

Figure 7:
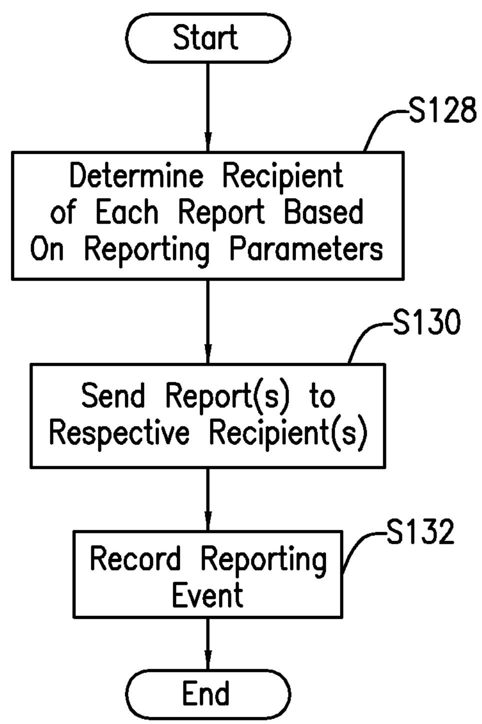
FIG. 7 is a flow chart of an exemplary reporting process in accordance with the principles of the present invention.

An exemplary reporting process for generating reports or alerts is described with reference to FIG. 7. Processor 42 determines at least one recipient associated with each event on the reportable list of WSN tag 14 events based on reporting parameters (Block S128). For example, the reporting parameters may include the nature of the report, reporting history and/or incident escalation rules, staff member ID, availability of store employee, among other factors. In one embodiment, processor 42 determines which recipient, i.e., store employee, should receive and act on a report/alert based on whether the store employee has received a previous report within a predetermined time, whether the store employee has acknowledge that a previous report has been acted on and/or spatial location of user device 16 associated with a user/employee with respect to the location of WSN tag 14 that generated the event. For example, since user devices 16 are part of the WSN, the location of user devices 16 and WSN tag 14 may be determined based on spatial location methods such that processor 42 determines that a first employee is closer to WSN tag 14 than a second employee. In this case, the first employee receives the report/alert from analytics device 24.

WSN tag 14 may be located within a store or predetermined location in which WSN access point 18 may use the signal strength of message transmitted by WSN tag 14 to determine the location of WSN tag 14. In other words, the received signal strength indicator ("RSSI") at WSN access point 18 is used to determine WSN tag 14 location. In one embodiment, the received signal strength may be average over time in order to improve location determination accuracy. Further, triangulation and curve fitting techniques based on Fri's law or empirical adaptations of Fri's law may then be used to determine the location of the transmitting WSN tag 14.

One type of report/alert that may be generated are hard reports in which the hard reports are generated and send to a human or recipient system that causes immediate attention and response such as of urgent/critical event reporting. For example, a hard report may include an audio announcement over the retail store loud speakers, or other audible alarm. Another example of hard report may include emails and/or text messages to user device 16 or other device that prompts an employee to respond.

Another type of report/alert that may be generated is a soft report in which the recipient of the report, e.g., employee, may examine the report at a convenient time when the recipient is interested in considering events of a specific type or nature. In the case of retail item management, the soft report may prompt an employee via user device 16 to evoke a face-to-face customer service engagement with a consumer if the employee is in a position to respond to the report, i.e., is available or is not already helping another customer. After processor 42 determines recipient(s) for each report, processor 42 cause transceiver 40 to transmit the reports to respective recipients (Block S130). For example, the report may be communicated to a recipient via a loud speaker, user device 16 and/or a desktop computer within the retail store such as at customer service, among communicated to other devices capable of receiving and displaying and/or announcing the report. Processor 42 causes the report event to be stored in motion database 50 (Block S132).

FIG. 8 illustrates an exemplary list of tag state change data 38 including both reportable and non-reportable WSN tag 14 state changes. In particular, list 68 may include a tag ID associated with the WSN tag 14 that transmitted the event, tag state associated with the changed state, date/time of event and whether the event is reportable or non-reportable. For example, WSN tag event 70 is associated with "Handling 256" that indicates WSN tag 14 has come to rest after previously being handled by a consumer. WSN tag event 72 is associated with "Handling 7" that indicates an intense handling characteristic of a shopper that is intently examining item 12. WSN tag event 74 corresponds to a "Battery Low" event that indicates WSN tag 14's battery voltage has dropped below a critical value. WSN tag event 76 corresponds to an "Outside area" event that indicates WSN tag 14 has moved outside a designated or allowed area, thereby indicating possible item 12 theft. WSN tag events 70-76 are reportable tab events. WSN tag events 78 and 80 may correspond to other events that require recording but do not warrant a report or alert. WSN tag events 82-86 correspond to "MIA" events that indicate WSN tags 14 have not reported a status or "heart beat" to WSN access point 18 within a predetermined amount of time do not warrant reporting. Other handling events may be used in accordance with the present invention.

The present invention can be realized in hardware, software, or a combination of hardware and software. Any kind of computing system, or other apparatus adapted for carrying out the methods described herein, is suited to perform the functions described herein. Furthermore, the invention may be realized using one or more radio technologies, modulation types, wireless protocols, reporting platforms (phone, table, pager, etc.), and may be incorporate one or more types of messaging schema (codes or code systems used to define the messages between WSN tag 14 and WSN access point 18, or between access points 18/20 and other network devices or entities on site or in a cloud computing environment). Furthermore, the functionality of analytics device 24 may be implemented on a server on a retail store premise with WSN access point 18, or may be included as part of WSN access point 18.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device. Furthermore, system 10 is not limited to retail item management as the WSN infrastructure and software modules describe herein may be used to enable other applications such as employee time management, customer service request and response, automated price updated and management, asset tracking, store traffic monitoring and area/department security, among other applications.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for identifying handling events of an item, the system comprising:
- at least one wireless sensor node, WSN, tag associable with the item, the WSN tag comprising:
  - a transceiver;
  - at least one sensor, the at least one sensor configured to generate sensor data based at least in part on motion of the WSN tag;
  - a memory, the memory configured to store at least one event filter and the sensor data;
  - a tag processor, the tag processor configured to:
    - filter the sensor data based on one of the at least one event filters, the one of the at least one event filters defining a plurality of movements and a threshold, each of the plurality of movements having to meet the threshold for the one of the least one event filters to be met;
    - determine whether an event occurred based on the filtering of the sensor data;
    - generate event data in response to determining an event occurred; and
    - cause the transceiver to transmit the event data.

2. The system of claim 1, wherein the at least one event filter includes a plurality of filter parameters, the filter parameters indicating a required series of movements of minimum force within a predetermined amount of time that must occur for the event filter to indicate an event.

3. The system of claim 1, wherein the transceiver is further configured to receive filter parameters; and
- the tag processor is further configured to update the at least one event filters based on the received filter parameters, the filtering of sensor data being based on the updated one of the at least one event filters.

4. The system of claim 1, wherein the event indicates at least one of: a person is examining a retail item associated with the WSN tag and the retail item associated with the WSN tag has come to rest after being handled.

5. A method for identifying handling of an item, the method comprising:
- generating, by a wireless sensor node (WSN) tag, sensor data based at least in part on motion of a wireless sensor node associable with the item;
- storing, by the WSN tag, at least one event filter and the sensor data;
- filtering, by WSN tag, the sensor data based on one of the at least one event filters, the one of the at least one event filters defining a plurality of movements and a threshold, each of the plurality of movements having to meet the threshold for the one of the event filters to be met;
- determining, by the WSN tag, whether an event occurred based on the filtering of the sensor data;
- generating, by the WSN tag, event data in response to determining the event occurred; and
- transmitting the event data.

6. The method of claim 5, wherein the one of the at least one event filter includes a plurality of filter parameters, the filter parameters indicating a required series of movements within a predetermined amount of time that must occur for the event filter to indicate an event.

7. The method of claim 5, further comprising:
- receiving filter parameters; and
- updating the at least one event filters based on the received filter parameters, the filtering of sensor data being based on the updated at least one event filter.

* * * * *